April 9, 1963  M. R. FERRERUELA  3,085,146
MACHINE FOR MANUFACTURING PIPES "IN SITU"
Filed Sept. 17, 1959  7 Sheets-Sheet 1

INVENTOR.
MIGUEL ROYO FERRERUELA
BY

April 9, 1963   M. R. FERRERUELA   3,085,146
MACHINE FOR MANUFACTURING PIPES "IN SITU"
Filed Sept. 17, 1959   7 Sheets-Sheet 2

INVENTOR.
MIGUEL ROYO FERRERUELA
BY
Michael S. Striker
Atty

April 9, 1963 M. R. FERRERUELA 3,085,146
MACHINE FOR MANUFACTURING PIPES "IN SITU"
Filed Sept. 17, 1959 7 Sheets-Sheet 3

INVENTOR.
MIGUEL ROYO FERRERUELA
BY

April 9, 1963  M. R. FERRERUELA  3,085,146
MACHINE FOR MANUFACTURING PIPES "IN SITU"
Filed Sept. 17, 1959  7 Sheets-Sheet 4

INVENTOR.
MIGUEL ROYO FERREUELA
BY
Michael S. Striker
Attorney

April 9, 1963 M. R. FERRERUELA 3,085,146
MACHINE FOR MANUFACTURING PIPES "IN SITU"
Filed Sept. 17, 1959 7 Sheets-Sheet 5

INVENTOR.
MIGUEL ROYO FERREUELA
BY
Michael S. Striker
atty

April 9, 1963 M. R. FERRERUELA 3,085,146
MACHINE FOR MANUFACTURING PIPES "IN SITU"
Filed Sept. 17, 1959 7 Sheets-Sheet 6

INVENTOR.
MIGUEL ROYO FERRERUELA
BY
Michael S. Striker

April 9, 1963  M. R. FERRERUELA  3,085,146
MACHINE FOR MANUFACTURING PIPES "IN SITU"
Filed Sept. 17, 1959  7 Sheets-Sheet 7

INVENTOR.
MIGUEL ROYO FERRERUELA
BY
Michael S. Stricker
Attorney

United States Patent Office 3,085,146
Patented Apr. 9, 1963

3,085,146
MACHINE FOR MANUFACTURING PIPES
"IN SITU"
Miguel Royo Ferreruela, Peru St. 277,
Buenos Aires, Argentina
Filed Sept. 17, 1959, Ser. No. 840,562
Claims priority, application Spain June 5, 1959
10 Claims. (Cl. 219—60)

This invention relates to the manufacture of pipes, and more particularly to a movable plant for the manufacture of pipe "in situ."

The movable plant of this invention is capable of making a pipe from metal strip and placing same on the ground in practically unlimited lengths.

Conventional methods of manufacturing pipes require fixed installations occupying relatively large areas, not only for the manufacture itself but also for bevelling, coating, forming flanges, storing and shipping, all of which adds to the cost of production.

Due to the bulky nature of the pipes, the cost of transportation and storage thereof is relatively high.

The labor required for laying down and joining together the lengths of pipe is responsible for the relatively high cost, a substantial reduction of which is made possible by the use of the movable plant of this invention.

The movable plant according to this invention comprises two main sections, viz.; a power and traction plant and a pipe manufacturing plant coupled thereto. Mounted on the pipe manufacturing plant is a crane for loading the rolls of metal strip. On being unwound, the metal strip is passed through a series of shaping-calibrating rollers until it reaches a machine for welding the seam, from which it is passed to a portion having pipe-pulling members continually moving the pipe onto a downwardly sloping platform directing the pipe towards the ground as the equipment is advanced at substantially the speed at which the pipe is being formed.

The plant also comprises a transverse welding equipment for welding the tail end of a metal strip roll to the starting end of a fresh roll, whereby it is possible to make a continuous pipe of a practically unlimited length.

In order that the invention may be more clearly understood and readily carried out, a preferred embodiment thereof has been illustrated in the accompanying drawings, in which.

The same reference characters are used to indicate like or corresponding parts throughout the drawings.

With reference to the drawings, it may be seen that the aforesaid movable plant comprises two main parts, vis., a power and traction equipment $a$ and a pipe manufacturing plant proper $b$.

The equipment $a$ comprises a truck on which there is installed a generator 1 with its driving engine 2 which is separate from the traction engine.

The manufacturing plant $b$ is mounted on a semi-trailer 3 coupled to the truck.

A main electric control panel 4 receives electric current supplied by the generator 1 and distributes same to the various units within the plant.

A metal structure 5 located at the end of the coupling between the semi-trailer and the truck, has an electrically operated hoist 6, the structure being arranged in the form of a bridge on which a crane 6 is capable of being moved so as to place on supports 7 the rolls of metal strip 8 arriving alongside the unit in conventional transportation means.

With the metal strip roll placed on the corresponding supports 7, the strip is unwound and passed between a set of rollers 9 from which it is passed through a series of rollers 10. These rollers 10 are arranged so as to progressively curve the strip around an axis extending longitudinally of the strip while bringing the edges of the strip adjacent to each other and delivering it to the shaping, calibrating and welding equipment $c$.

Figure 3:
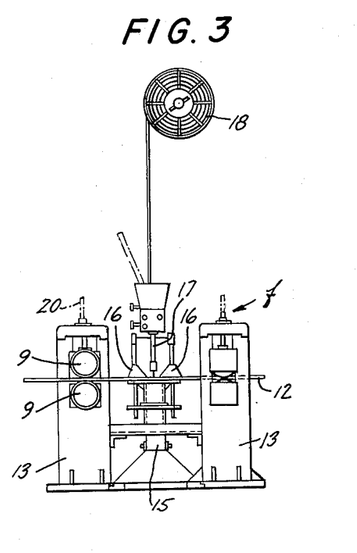
FIG. 3 is an enlarged view of the transverse welding section of the unit.
Figure 4:
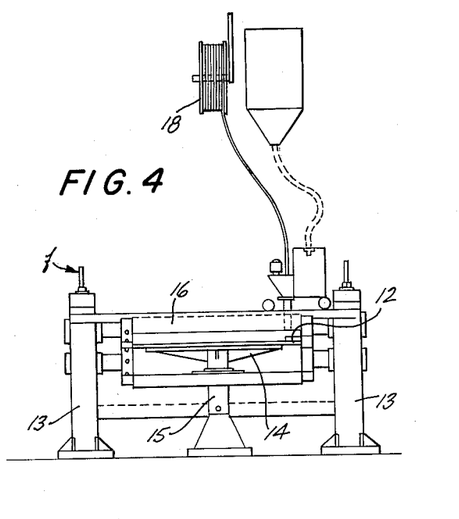
FIG. 4 is a side view of the welding section shown in FIG. 3.
Figure 5:
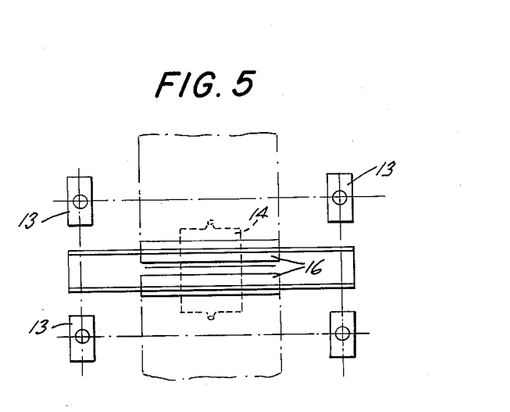
FIG. 5 is a plan view of the welding section shown in FIGS. 3 and 4.

Beyond this equipment $c$ the plant comprises pulling or drawing members $d$ arranged to move the formed pipe through guide rollers 11 towards an inclined platform $e$ from which the pipe can slide to the ground. In this manner the length of the pipe obtained is equal to the length of the metal strip. When a fresh roll of metal strip is mounted on supports 7, the starting end thereof is welded to the terminal end of the strip of the previous roll. For this purpose, a welding equipment $f$ is provided as will be explained hereinafter with reference to FIGS. 3, 4 and 5.

The rollers 9 through which the metal strip 12 is passed are cylindrical and arranged in pairs mounted on respective brackets 13. Between these brackets there is provided a press 14 which by means of a pneumatic mechanism 15 is capable of being pressed fairly tightly against a pair of stops 16 limiting the stroke thereof, said stops being parallel and having slidably mounted therebetween an electrode 17 which is supplied automatically from the roll 18.

The flux material is supplied from a conventional hopper 19 (FIG. 4) and is led to the surface to be welded through a conduit 20.

In this manner, a continuous strip is obtained.

Figures 6, 7:
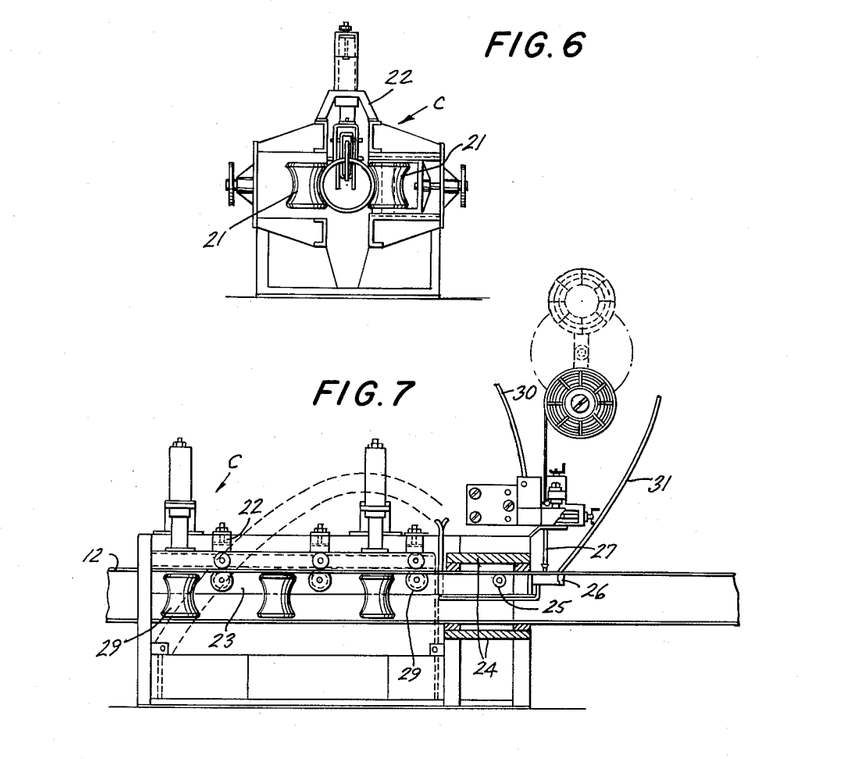
FIG. 6 is an enlarged view of the longitudinal welding section, taken along the line A–B of FIG. 1.
FIG. 7 is a side view, partly in section, of the longitudinal welding section shown in FIG. 6.
Figure 8:
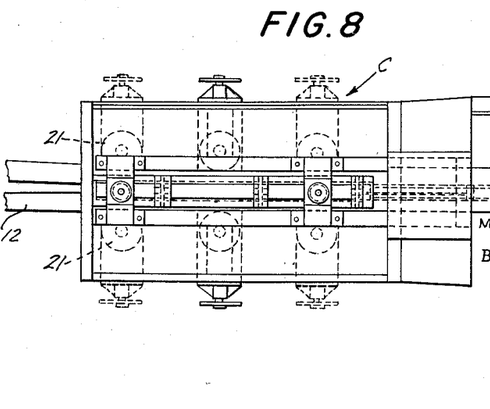
FIG. 8 is a plan view of the longitudinal welding section shown in FIGS. 6 and 7.
Figure 9:
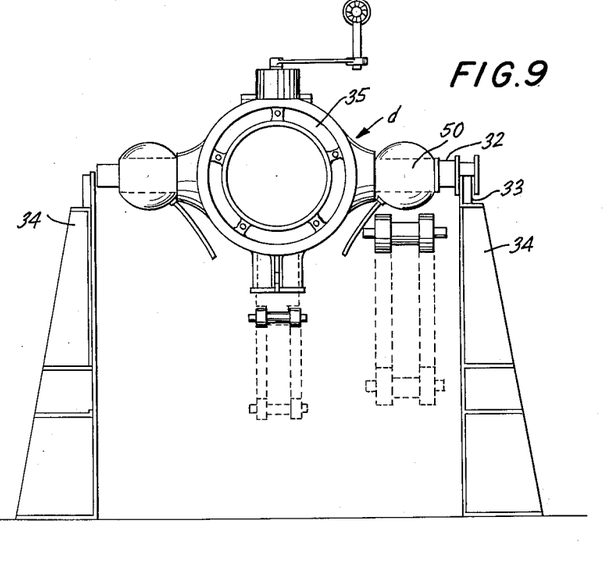
FIG. 9 is an enlarged sectional view showing the pipe drawing mechanism in detail.
Figure 10:
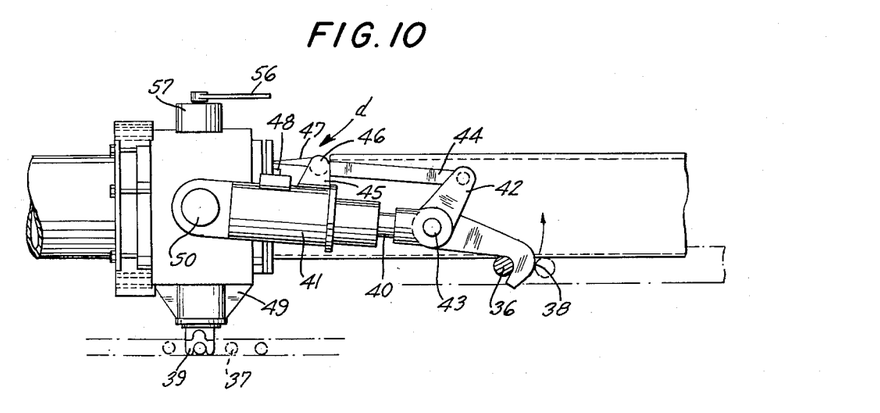
FIG. 10 is a side view of the pipe drawing mechanism, showing the elements engaging the drag and return chains of the system.
Figure 11:
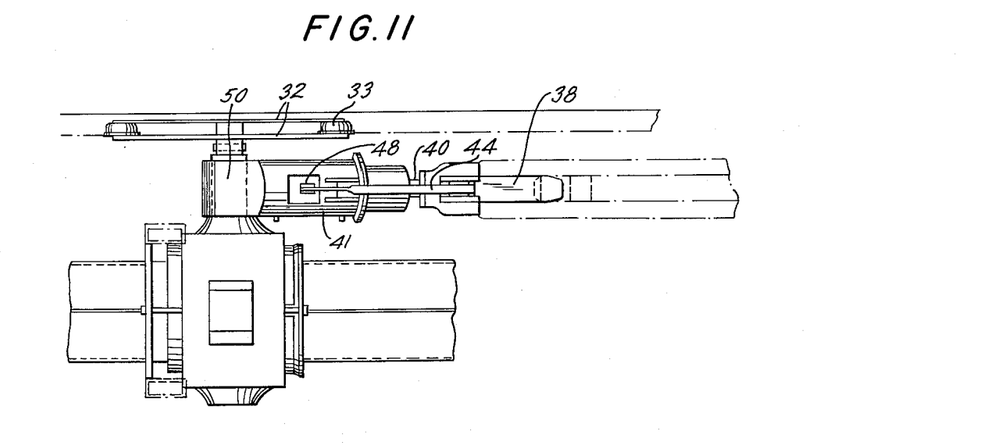
FIG. 11 is a plan view of the mechanism shown in FIG. 10.

The shaping, calibrating and welding equipment $c$ is shown in the enlarged views of FIGS. 6, 7 and 8 and the main parts thereof will be described hereunder.

The metal strip 12 arrives at this section of the machine with the edges thereof near each other, due to the action of the rollers 10, and is passed between a first set of rollers 21 which give the strip a substantially cylindrical shape, without joining the edges thereof. Inasmuch as these rollers act on the sides of the tube, the edges thereof will not have a curvature of the same radius as the rest of the pipe due to the fact that the strip is less ductile in the zone of said edges. Therefore, a set of male and female rollers 22 are provided, arranged in pairs so that the lower rollers will be located within the tube, while the upper or female rollers have the edges thereof engaging the tube edges which are separated from each other by the annular projection of the male rollers, thereby forcing the metal strip to assume a normal cylindrical curvature.

The male rollers of the group are each mounted between supports 23 extending beyond the last set of rollers into a final shaping die 24, and in the neighborhood of the zone of this die where the tube edges abut there is provided a further guide roller 25 carried by supports 23 and followed by a suitably cooled support 26, preferably made of copper.

Figure 1A:
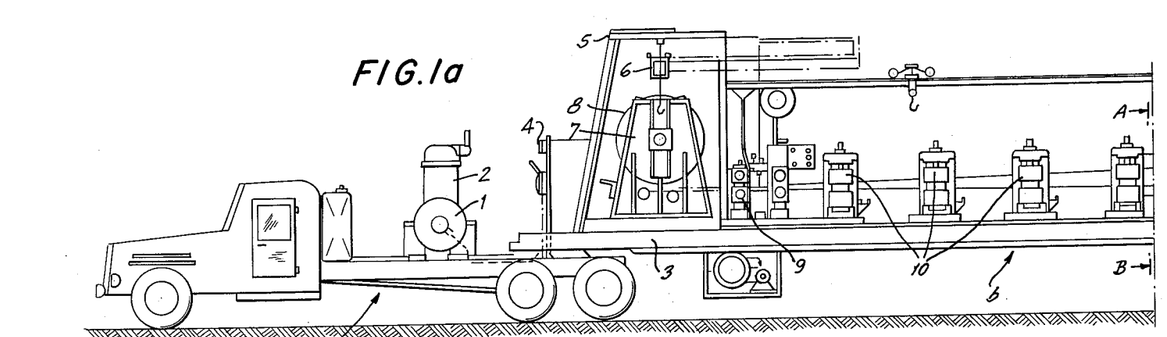
FIGS. 1a, 1b and 1c, when placed side by side in the order named, are a side view of a movable pipe making unit in accordance with this invention.
Figure 1B:
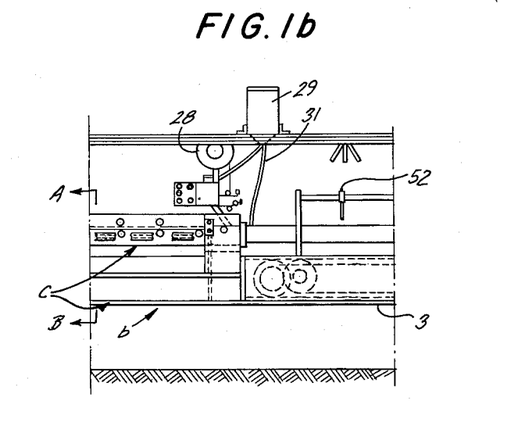
Figure 1C:
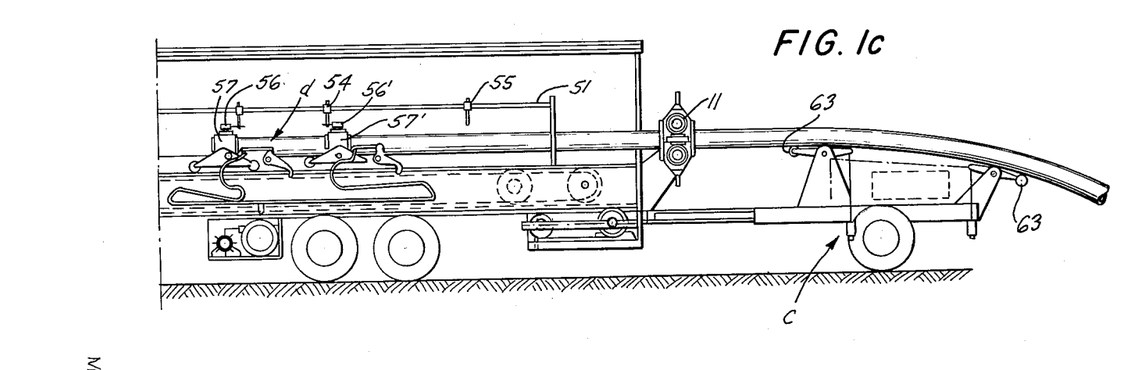
Figure 2A:
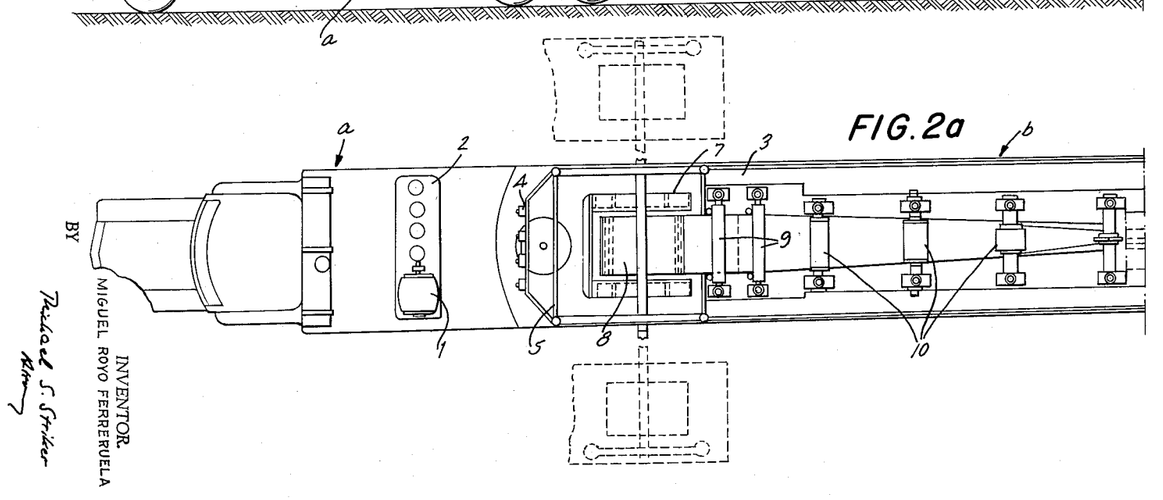
FIGS. 2a, 2b and 2c, when placed side by side in the mentioned order, constitute a plan view of the unit shown in FIGS. 1a, 1b and 1c.
Figure 2B:
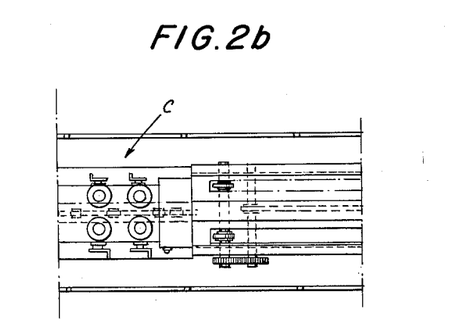
Figure 2C:
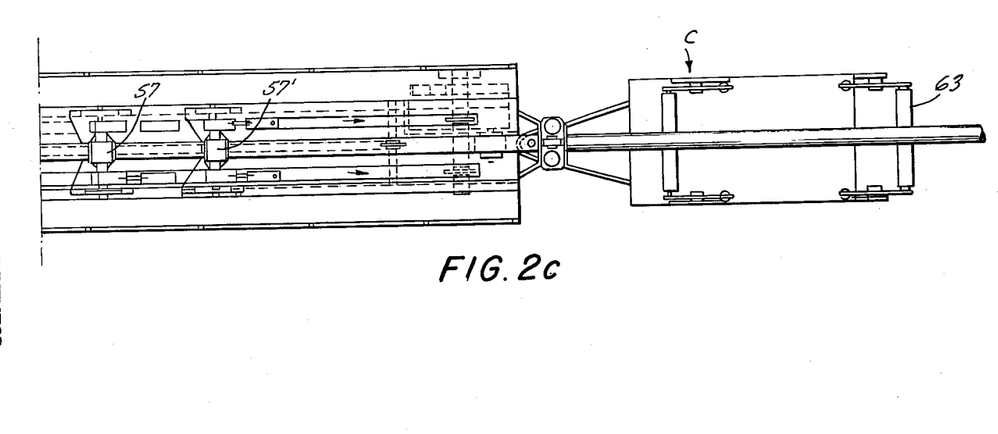

Once the pipe has been shaped, the final closure of the edges thereof is obtained in the die 24, at the outlet of which there is provided an electric welding equipment the electrode 27 of which is aligned with the closely adjacent pipe edges. The electrode is supplied with current from the roll 28 and the flux material flows from the hopper 29 (FIG. 1) through the conduit 30 onto the surface to be welded. A means for recovering flux by absorption is also provided and indicated at 31.

The welded pipe is continuously pulled by the group d consisting of a jaw system cooperating with endless chains and coupling means hydraulically and electromagnetically actuated, the mechanism of which will be described hereunder.

Figure 12:
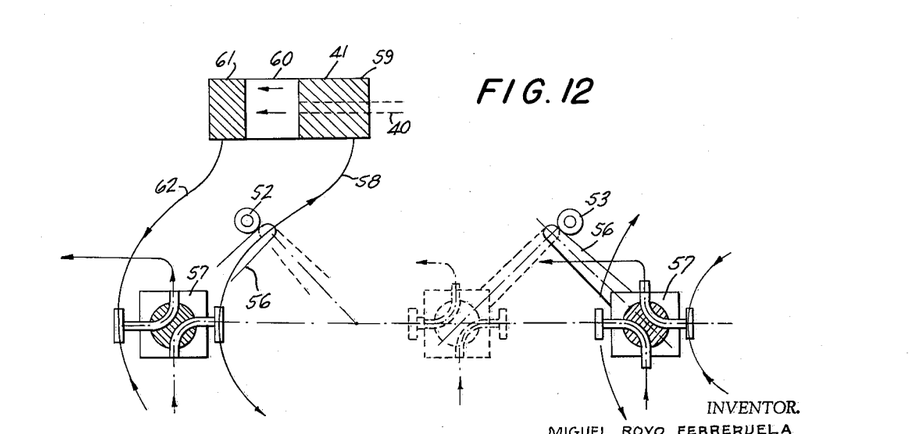
FIG. 12 is a diagrammatic representation of the hydraulic mechanism and valve system thereof.

The system mechanism is shown in the enlarged views of FIGS. 9, 10, 11 and 12. This mechanism comprises a carriage 32 the wheels 33 of which ride on rails 34. Between each pair of wheels there is provided a set of annular jaws 35 which are automatically adjusted through unidirectional advance, i.e., that the dragging of the pipe takes place only in the direction indicated by the arrow (FIG. 10) and when the carriage moves backwards it releases the jaws 35 until the direction of the movement is reversed so as to repeat a further working cycle. To this end, the mechanism includes two sets of endless chains 36 and 37 the directions of motion of which are opposite relative to each other. These chains are each capable of engaging hook members 38 and 39 provided on the jaw-carrying carriage. Referring to the coupling member 38, this member is constituted by a hook mounted on the end of a link 40 of a double-action hydraulic piston 60 (FIG. 12).

The hook 38 has a finger 42 extending from the zone 43 in the form of a lever arm the free end of which is pivoted to a lever 44 connected to a fixed bracket 45 secured to the exterior of a cylinder 41 pivotally on the shaft 46, said arm extending beyond said pivoting point so as to form a cam 47 under the end portion of which there is provided an electric switch 48 associated with an electromagnet 49 the movable armature of which is joined to the hook member 39. The latter is substantially arc-shaped and capable of registering by juxtaposition with the rollers and openings of the chain 37. The cylinder 41 is also pivoted to the shaft 50. When the piston is moved in the direction indicated by the arrow (FIG. 10) it will cause the hook 38 to move upwards, thereby releasing the chain 36, said upward movement being about the shaft 50 in view of the position of the arm 44. Consequently, the cam 47 will move downwards and actuate the switch 48, thereby acting on the circuit of the solenoid 49 and lowering the hook member 39 until it engages the chain 37 moving in a direction opposite to that of the chain 36.

Referring back to FIG. 1, it may be seen that a rail 51 is arranged above the carriages. Said rail 51 is provided with four stop members 52, 53, 54 and 55 capable of being engaged by arms 56, 56' of respective four-way valves 57, 57' (see FIG. 12).

The cylinder 41 receives fluid under pressure supplied by a conventional pump through a conduit 58, said fluid entering the chamber 59 and moving the piston 60 in the direction indicated by the arrow. Any liquid in the chamber 61 will return to the reservoir through a conduit 62. At this time, the hook 38 will have moved downwards and engaged the drag chain 36, and simultaneously the release of the switch 48 will have energized the solenoid 49, thereby causing the release of the coupling between the member 39 and the chain 37 which returned the carriage to the cycle starting point. At the end of its travel, the lever 56 of valve 57 will strike the stop 53, reversing the hydraulic circuit and therefore when the energizing of the electromagnet 49 is cut off through the action of the cam 47 onswitch 48, the hook member 39 will fall on the chain 37 and the latter will drag the assembly backwards until a further working cycle is repeated. The speed of the chain 38 is substantially lower than that of chain 37 in order to accelerate the return movement of the pulling members. Two traction equipment d are provided, arranged so as to secure the continuous drawing of the completed pipe. Thus, while one equipment returns the other will continue to draw the pipe.

The completed pipe is moved on the guides 11 towards the carriage e is provided with a plurality of rollers 63 mounted on swing bars and arranged on an inclined plane so as to facilitate the laying down of the piping.

It is obvious that in carrying out the invention, many changes in the structural details thereof will occur to those skilled in the art, without departing from the scope of the invention as clearly set forth in the appended claims.

I claim:

1. In an arrangement for producing from metal strip material a continuous pipe of indefinite length and for continuously laying out the same as a pipe line, in combination, support means movable in a predetermined direction relative to ground; moving means for moving said support means at a predetermined speed; material supply means mounted on said support means and including means for temporarily storing a length of metal strip material in form of a coil thereof and for unreeling said strip material from said coil and feeding it in a direction opposite to said moving direction; pipe forming means mounted on said support means for continuously converting said strip material unreeled from said coil into a pipe member; second moving means for moving said strip material through said pipe forming means; and delivering means for delivering the formed pipe member in said opposite direction and at said predetermined speed from said support means while the latter are being moved in said predetermined direction at the same speed so that said pipe member is laid out in stationary condition relative to ground.

2. An arrangement according to claim 1, wherein said second moving means include at least one clamping means movable in one and the opposite direction longitudinally of said pipe member and capable of automatically engaging said pipe member only while it is moving in said one direction, and means for causing a reciprocating movement of said clamping means with a predetermined stroke length.

3. An arrangement according to claim 1, wherein said second moving means include at least one clamping means movable in one and the opposite direction longitudinally of said pipe member and capable of automatically engaging said pipe member only while it is moving in one direction, guide means for supporting said clamping means during its movement, a first and a second endless transporting member moving substantially parallel with the longitudinal axis of said pipe member, said first transporting member moving in a direction opposite to said predetermined direction at said predetermined speed, said second transporting means moving in said predetermined direction at a higher speed, hydraulic means and controls for alternatively causing coupling of said clamping means with said first transporting means for moving said clamping means along said guide means and in engagement with said pipe member in said one direction a predetermined distance, and for causing thereafter coupling of said clamping means with said second transporting means for moving said clamping means along said guide means and disengaged from said pipe member in opposite direction the same distance, whereby said clamping means reciprocate and move said pipe member a predetermined distance with every stroke in one direction.

4. An arrangement as claimed in claim 1 and wherein said delivering means is in the form of a pipe-pulling means comprising a pair of carriages slidably mounted on corresponding rails, each of said carriages having mounted thereon an annular clamp progressively adjustable unidirectionally, said carriages having at either side of said clamps a pair of double-action hydraulic cylinders the piston rods of which terminate in respective hooks capable of engaging a unidirectional advance endless chain, said cylinders being pivotally mounted on corresponding shafts secured to said carriages, said chain-engaging hooks having respective fingers articulated in the form of lever arms to respective links the bearing points of which are articulated to the carcasses of the respective cylinders, at least one of said links extending beyond the point of articulation thereof and projecting over an electric push-button associated with a relay capable of causing the actuation of a further hook located over the path of a further unidirectional endless chain movable in a direction opposite to that of the first-named chains, a double switching four-way valve being inserted in the hydraulic circuit the switch of which has an arm capable of engaging stop members substantially fixed within the path of said arms.

5. An arrangement as claimed in claim 4, wherein the carriage traction chain is movable at a speed substantially lower than the chain movable in the opposite direction.

6. In an arrangement for producing continuous pipe of indefinite lengths, in combination, moving means for continuously moving the pipe in one direction and comprising a track extending in axial direction of the pipe to be moved; a pair of carriages mounted on said track for movement therealong; a first endless transporting member extending substantially parallel to said track and having a run adapted to move with a first speed in said one direction; a second endless transporting member extending substantially parallel to said track and having a run adapted to move with a second speed greater than said first speed in a direction opposite to said one direction; means operatively connected to said first and second transporting members for moving said runs thereof at said speeds in said directions; coupling means on each of said carriages for selectively coupling said carriages to said runs of said transporting members; four fixed control members spaced from each other along said track in said one direction and cooperating in pairs with said coupling means of each carriage to couple one of said carriages to one of said runs and the other of said carriages to the other of said runs when said carriages respectively arrive at the control members spaced farthest from each other and to couple said one carriage to said other of said runs and said other of said carriages to said one of said runs when said carriages respectively arrive at the control members nearest to each other; and clamping means on each of said carriages and adapted to engage the pipe for moving the latter only when the respective carriage is moving in said one direction.

7. An arrangement as defined in claim 6 in which said endless transporting members are formed by endless chains.

8. An arrangement as defined in claim 7 in which each of said coupling means comprises a pair of coupling members respectively adapted to engage said runs of said endless chains and each movable between a coupling position in which said coupling member connects the respective carriage to the respective run for movement therewith and a disengaged position; cylinder and piston means operatively connected to one of said coupling members for moving the same between said positions thereof; valve means operatively connected to said cylinder and piston means and cooperating with the respective pair of control members to cause that cylinder and piston means to move said one coupling member to one of said positions thereof when the respective carriage arrives at one of said pair of control members and to move said one coupling member to the other of said positions thereof when said carriage arrives at the other of said pair of control members; cam means operatively connected to said cylinder and piston means to be moved thereby; and electrical control means controlled by said cam means and operatively connected to said other of said coupling members to move the latter to said coupling position thereof when said one coupling member is moved to said disengaged position thereof and to said disengaged position thereof when said one coupling member is moved to said coupling position.

9. In an apparatus for manufacturing a seam-welded pipe, in combination, support means for supporting a coil composed of an elongated strip of metal; roller means receiving the strip from said coil and curving the strip transversely into the form of a channel which is almost closed and in which the side edges of the strip are located adjacent to each other; die means receiving the channel from said roller means and further shaping the channel to place said side edges closely adjacent to each other; advancing means cooperating with the strip to continuously advance the same with respect to said roller means and die means; and welding means located along the path of movement of the strip subsequent to and adjacent to said die means for welding the side edges of the strip to each other after said side edges have been placed in close proximity by said die means so as to form continuously from the strip on the coil carried by said support means an elongated pipe, said advancing means being located along the path of movement of the strip subsequent to said welding means and engaging the pipe subsequent to said welding means and pulling the latter past said welding means and through said die means so as to continuously advance the strip with respect to said roller means while withdrawing the strip from the coil carried by said support means.

10. In an apparatus for manufacturing a seam-welded pipe, in combination, support means for supporting a coil composed of an elongated strip of metal; roller means receiving the strip from said coil and curving the strip transversely into the form of a channel which is almost closed and in which the side edges of the strip are located adjacent to each other; die means receiving the channel from said roller means and further shaping the channel to place said side edges closely adjacent to each other; advancing means cooperating with the strip to continuously advance the same with respect to said roller means and die means; welding means located along the path of movement of the strip subsequent to and adjacent to said die means for welding the side edges of the strip to each other after said side edges have been placed in close proximity by said die means so as to form continuously from the strip on the coil carried by said support means an elongated pipe; guide means receiving the finished pipe and guiding the same to a desired location; carrier means carrying said support means, said roller means, said die means, said advancing means, said welding means, and said guide means; and moving means operatively connected to said carrier means for moving the same in a direction opposite to that in which the pipe is advanced during guiding of the pipe by said guide means whereby the pipe itself can remain substantially stationary while being laid down when the moving means moves in a direction opposite to that in which the pipe is advanced at a speed equal to the speed of advance of the pipe.

References Cited in the file of this patent

UNITED STATES PATENTS

| | | |
|---|---|---|
| 611,222 | Ries | Sept. 20, 1898 |
| 1,665,851 | Harris | Apr. 10, 1928 |
| 1,954,160 | Wheeler | Apr. 10, 1934 |
| 2,023,897 | Neckerman | Dec. 10, 1935 |
| 2,105,079 | Holslag | Jan. 11, 1938 |
| 2,202,898 | Caputo | June 4, 1940 |
| 2,203,151 | Iversen | June 4, 1940 |
| 2,250,869 | Jones et al. | July 29, 1941 |
| 2,786,933 | Hume | Mar. 26, 1957 |